United States Patent [19]

Banks et al.

[11] 4,104,201

[45] Aug. 1, 1978

[54] CATALYTIC STEAM REFORMING AND CATALYSTS THEREFOR

[75] Inventors: Reginald George Sinclair Banks; David James Paterson; Alan Williams, all of Solihull, England

[73] Assignee: British Gas Corporation, London, England

[21] Appl. No.: 754,513

[22] Filed: Dec. 27, 1976

Related U.S. Application Data

[63] Continuation of Ser. No. 609,486, Sep. 2, 1975, abandoned.

[30] Foreign Application Priority Data

Sep. 6, 1974 [GB] United Kingdom ............ 39048/74

[51] Int. Cl.$^2$ .................. B01J 21/04; B01J 23/46; B01J 23/74
[52] U.S. Cl. .................. 252/466 B; 48/214 A
[58] Field of Search ............ 252/466 B; 48/214 A, 48/214 R

[56] References Cited

U.S. PATENT DOCUMENTS

| 3,271,325 | 9/1966 | Davies et al. ............ 252/466 B |
| 3,334,055 | 8/1967 | Dowden et al. ............ 48/214 A |
| 3,904,554 | 9/1975 | Dicks ............ 252/466 PT |

FOREIGN PATENT DOCUMENTS 994,278  6/1965  United Kingdom ............ 48/214 A

Primary Examiner—W. J. Shine
Attorney, Agent, or Firm—Larson, Taylor and Hinds

[57] ABSTRACT

A catalyst suitable for steam reforming, especially at low temperatures and high pressures, which is resistant to polymer deactivation, comprises nickel, alumina and ruthenium, optionally together with an oxide, hydroxide or carbonate of an alkali metal or alkaline earth-metal wherein the amount of ruthenium does not exceed 0.8% by weight of the weights of the other components of the catalyst. The nickel and aluminium components of the catalyst are prepared by coprecipitation with the nickel and aluminium components, by impregnation of the precipitated nickel and aluminium components or by physical blending of an insoluble ruthenium compound with the precipitated nickel and aluminium components.

7 Claims, No Drawings

CATALYTIC STEAM REFORMING AND CATALYSTS THEREFOR

This is a continuation, of application Ser. No. 609,486 filed Sept. 2, 1975, and now abandoned.

This invention relates to catalysts and to processes employing such catalysts. More particularly the invention is concerned with the catalytic gasification of organic materials to produce gases containing methane.

The catalytic gasification of hydrocarbons to produce methane containing gases is well known. For example in out U.K. Patent Specification No. 820257 there is described a process for the production of gases containing methane from mixtures of predominantly paraffinic hydrocarbons containing from 4 to 10 carbon atoms, wherein the vapour of the hydrocarbons and steam are passed through a bed of nickel catalyst under atmospheric or superatmospheric pressure, and the hydrocarbon vapour and steam are passed into the catalyst bed at a temperature above 350° C such that the bed is maintained by the reaction at a temperature within the range of 400° to 550° C. This process is known as the Catalytic Rich Gas (CRG) process.

In U.K. Patent Specifications Nos. 969637, 1150066 and 1155843 are described catalysts useful in the practice of the process claimed in U.K. Patent Specification No. 820257, and processes for preparing such catalysts. These catalysts are nickel based catalysts formed by co-precipitation of nickel (in the form of a salt) and alumina and may contain small amounts of promoters such as an alkali or alkaline earth metal.

In the gasification of hydrocarbons by steam reformation, an observed phenomeonon is a lowering of the catalyst bed temperature at the front end of the bed owing to the fact that the initial reaction is highly endothermic. The temperature then rises as the exothermic methanation reactions get under way. As the catalyst becomes spent, the reaction front and hence the endothermic dip moves down the bed; as it does so it may deepen, that is, the minimum temperature may become lower. Several problems are associated with this phenomenon, principally deactivation of the catalyst. care must be taken to ensure that the feedstocks are preheated to a high enough temperature to ensure that the endothermic reaction does not cool the reactants and catalyst to the extent that the reaction rate becomes too small to be of practical value. A second, more permenant problem, is that at lower temperatures there is an increased tendency for reactions to occur in which polymeric substances are formed on the catalyst surfaces and deactivate the catalyst. When polymer is formed the deactivation process tends to be self-sustaining since once the catalytic sites are occluded the rate of reaction slows down. Hence the temperature of the bed will not rise because the exothermic reactions fail to get under way and more polymer is subsequently formed on the bed with the result that the endothermic dip rapidly expands down the bed.

To overcome the results of this form of deactivation, higher inlet and operating temperatures may be used, but this may lead to difficulties with sintering of the catalyst. It would therefore be desirable to be able to employ a catalyst which is more reistant to polymer deactivation than those catalysts hitherto available, to allow lower inlet and operating temperatures to be continously used.

According to the present invention there is provided a catalyst suitable for use in the process of catalytic steam reforming of hydrogen and carbon containing compounds to produce methane containing gases which catalyst comprises nickel, ruthenium, alumina and optionally an oxide, hydroxide or carbonate of an alkali metal or alkaline earth metal, wherein a catalyst has been prepared by coprecipitation of nickel and aluminium compounds at least from solution followed by reduction of the nickel compound to metallic nickel, and optionally addition of the alkali metal or alkaline earth metal compound, and wherein ruthenium is present in an amount to provide not more than 0.8% by weight of the combined weights of the other catalyst components.

For the sake of brevity the alkali metal and alkaline earth metal compounds shall herein be referred to as "Alkali compounds".

The present invention further provides a process for the preparation of the catalysts of this invention which process comprises treating an aqueous solution of water soluble compounds of nickel and aluminium with a solution of a water soluble base thereby to form an insoluble precipitate comprising compounds of aluminium and nickel, and incorporating ruthenium into said precipitate by the addition of a ruthenium compound in an amount such that the ruthenium content does not exceed 0.8% of the weight of the other compounds of the catalyst.

The catalysts of this invention may be prepared by coprecipitation techniques disclosed in our prior U.K Specification Nos. 969637, 1150066 and 1155843, whereby the nickel and aluminium components at least are formed by coprecipitation under alkaline conditions. The ruthenium component may be coprecipitated with the nickel and aluminium components. Alternatively, the calcined composition containing nickel, alumina and optionally the alkali compound may be subjected to impregnation with a solution of a ruthenium containing compound prior to final reduction of the catalyst. In yet another alternative, the ruthenium may be added in the form of a solid that is physically mixed with the product of coprecipitation of the nickel and aluminium components. The ruthenium compound (when, for instance, it is ruthenium oxide) may provide only the ruthenium component, or it may provide an alkali compound also, as when it is an alkali metal or alkaline earth metal ruthenate, eg barium ruthenate.

Any ruthenium containing soluble compound may be employed if the ruthenium is coprecipitated with the other components provided it is decomposible under alkaline conditions. Some anions, such as chloride are not desirable in the final catalyst since they may deleteriously effect catalyst performance. However, ruthenium chloride may be employed in the corprecipitation stage provided adequate washing of the catalyst is carried out to remove the undesirable anions. For this reason, however, it is not desirable to employ ruthenium chloride if the ruthenium component of the catalyst is formed by impregnation of the other non-reduced catalyst precursors.

The nickel contents of the calcined but unreduced catalyst may range from 25 to 75% by weight of the combined weights of the total catalytic components and preferably the nickel contents range from 40 to 70% by weight.

The ruthenium content should preferably range from about 0.2 to 0.8% by weight based on the combined weights of the total catalyst components, most preferably not more than about 0.5%. The alkali compounds may be present in the proportions specified in our prior U.K. Patent Specification Nos. 1150066 and 1155843. Thus, for example, for calcined, unreduced catalysts containing more than 40% nickel, an alkali metal component may be present in an amount of from 0.10 to 0.75% preferably 0.4 to 0.7% by weight, based on the combined weights of nickel and alumina. Similarly, if the catalyst contains an alkaline earth metal component, the proportion of such a component may range from 10 to 30% preferably up to 20% by weight based on the total weight of the catalyst components.

In the preparation of the catalysts of this invention it is essential that the nickel and alumina components at least be prepared by coprecipitation since nickel-alumina base catalysts prepared by other methods, such as fusion, the use of hydraulic cements or by impregnation, do not exhibit sufficient catalyst activity to enable them to be used for steam reforming processes to produce gases containing a predominant proportion of methane. Thus the beneficial effects in respect of resistance to deactivation by polymer formation attributable to the presence of ruthenium would be lose unless the catalyst is prepared by a coprecipitation technique.

The catalysts of this invention are suitable for steam reforming hydrocarbons and lower alkanols to produce methane containing gases. In order to obtain high methan contents in the produce equilibrium gas it is well known that as low outlet temperatures as possible are required. However, the use of low temperatures affects the activity of the catalyst for the reasons given above. The use of the catalysts of this invention therefore offers the advantage of being able to operate at lower temperatures without incurring deactivation by polymer formation.

In the operation of the process of the invention the other process parameters e.g., steam to feedstock ratio are generally the same as those employed in conventional CRG processes as described in our aforementioned patent specifications, except that the temperature at which the feedstock is preheated, and hence the bed temperature, is generally lower than that employed in conventional CRG processes. In turn, lower temperatures allow operations to be at higher pressures, from the view point of the mechanical strength of vessel wall materials, with the well known advantage of higher methane contents in the product gases.

Thus, in accordance with this invention there is provided a process for the production of methane containing gases which comprises passing a mixture of steam and a desulphurised organic feedstock predominantly containing saturated compounds of hydrogen and carbon and having a final boiling point of not more than 300° C over a bed of nickel-ruthenium-alumina and optionally alkali compound catalyst as hereinbefore described, wherein the mixture is passed into the catalyst bed at a temperature of not less than 325°, preferably 380°–580° C, such that the temperature of the bed is maintained by the reaction within the range of 400° to 600° C.

The process of the invention may be operated at pressures up to 100 atmospheres, preferably between 10 to 60 atmospheres. At high pressures, for example 45–55 atmospheres the catalyst has good performance when the inlet temperature ranges from 400° to 500° C or preferably 400° to 450° C.

The feedstocks to be employed in process of this invention include predominantly saturated hydrocarbon feedstocks such as light distillates, naphthas or kerosenes, which have a final boiling points of not more than 300° C. Alternatively, the process of the invention may be employed to gasify very light feedstocks such as lower alkanols, e.g. methanol, and lower paraffins e.g., propane, butane and LPG.

The ratio of steam to feedstock is generally in excess of the stiochiometric requirement and may range from 1.0 to 3.0 lb moles steam per lb carbon atom.

Although the process of the invention may be operated at those temperatures conventionally employed for catalytic steam reforming, it has been found that the process is beneficially operated at preheat temperatures which are lower than those conventionally employed because of the catalysts resistance to low temperature deactivation. Thus the process of the invention may be carried out using preheat temperatures of not greater than 450° C.

The advantages of the catalyst of this invention will be illustrated by reference to the following example:

A coprecipitated catalyst was prepared according to the techniques described in U.K. Patent Specification No. 969637 containing about 50% nickel, about 1.0% alkali metal (Na&K) and 0.5% ruthenium (calculated as $RuO_2$) and packed into a ¼ inch O.D. reactor as ⅛ inch pellets to a depth of 33 inches. The system was then pressurised to 450 p.s.i.g. with nitrogen, and heated at 450° C. The catalyst was then reduced overnight in flowing hydrogen at about 2 c.ft/h. Water was then pumped via an evaporator at 65 ml./h at 450° C and this steam/hydrogen mixture maintained for 1 hr. Oil (L.D.F. 170) was then introduced at 55 ml./h via another evaporator at 250°–300° C and the hyrogen supply switched off. After mixing in a ¼ inch tube the steam/hydrocarbon mixture is passed downwards via a preheat furnace over the catalyst bed and product gases are passed via a condenser to remove excess steam to a relief valve and finally to a gas meter.

The reactor is maintained in an adiabatic state so that the endothermic and exothermic effects can be observed by a series of thermocouples at set intervals along the bed which are connected to a recorder chart. The rate of movement of the reaction zone down the bed give a measure of the catalyst activity and lifetime.

The reaction conditions, viz inlet temperature and pressure were altered during the run to create more severe conditions on the catalyst The results of the run are shown in Table 1, wherein the time elapsed from the commencement is given in arbitary units.

TABLE 1

| Stage | 1 | 2 | 3 | 4 | 5 |
|---|---|---|---|---|---|
| Time elapsed | 10 | 11.8 | 12.7 | 14.7 | 21.4 |
| Inlet Temp. ° C | 450 | 450 | 450 | 430 | 410 |
| Outlet Temp. ° C. | 510 | 515 | 517 | 504 | 476 |
| Pressure (psig) | 450 | 600 | 700 | 700 | 700 |
| Synthesis Gas Composition: | | | | | |
| $CO_2$ | 23.52 | 23.55 | 23.69 | 23.78 | 23.87 |
| CO | 0.96 | 0.90 | 0.70 | 0.56 | 0.44 |
| $H_2$ | 12.35 | 11.39 | 9.84 | 8.81 | 7.79 |
| $CH_4$ | 63.17 | 64.16 | 65.77 | 66.85 | 67.9 |

Stage 1 was carried out under conventional CRG conditions for a period of 10 arbitrary units of time when, using a conventional catalyst, deactivation might be expected tooccur, the reaction conditions were then altered over a period of 4.7 units to produce conditions under which polymer formation (at 410° C) would quickly complete total deactivation of the catalyst. Using the catalyst of the present invention it was found that the gasification continued for a further 6.7 units before feedstock slip.

In a comparative experiment a conventional catalyst was tested at 450° C/450 psig (conventional conditions) and at 410° C/700 psig. Assuming the catalyst is given an arbitrary life of 100 under conventional conditions, Table 2 shows a comparison between the lives of a conventional catalyst and the catalyst of the invention at 450°/450 psig and 410°/700 psig respectively.

TABLE 2

| Catalyst | Conventional | Invention |
|---|---|---|
| 450/450 | 100 | 102 |
| 410/700 | 10.8 | 25.6 |

It will be seen that under these severe conditions catalyst life is more than double when using the catalyst of the invention.

When using the catalysts of the present invention to gasify feedstocks having a final Boiling Point above 240° the process of the invention may be modified by recirculating a part of the synthesis gas back to the inlet of the reactor to be admixed with fresh feedstock and steam. In such cases, the ratio of fresh steam to feedstock ratio may be lowered since part of the process steam may be present as unreacted steam in the recycled synthesis gas. The ratio of recycled gas to non-recycled gas may range from 0.5 to 50:1 (vol/vol).

We claim:

1. A process for the preparation of a low temperature steam reforming catalyst, said catalyst comprising nickel in an amount of from 25 to 75% nickel, ruthenium in an amount less than 0.8% and alumina, said percentages being calculated as weight percentages of the total calcined but unreduced catalsyt, wherein said process comprises coprecipitation of the nickel and aluminum components from aqueous solutions of nickel and aluminum salts followed by washing, drying, calcination and reduction of the precipitate to reduce the nickel component to metallic nickel, and wherein said ruthenium component is incorporated into the catalyst prior to the reduction step by a step selected from the group consisting of (a) impregnation of the washed, dried and calcined nickel-aluminum containing precipitate, from an aqueous solution of a ruthenium containing salt, or (b) physical blending of a solid ruthenium compound with the washed, dried and calcined nickel-aluminum containing precipitate.

2. A process as claimed in claim 1 where in the ruthenium component of the catalyst is incorporated by impregnation, from solution onto the coprecipitated nickel and aluminium containing precipitate after washing, drying and calcination of the nickel-aluminium containing precipitate.

3. A process as claimed in claim 1 wherein said ruthenium component of the catalyst is incorporated by physical blending of a solid ruthenium compound with a washed, dried and calcined nickel-aluminium containing precipitate.

4. A process as claimed in claim 1 wherein said catalyst further comprises an alkali metal or alkaline earth metal component incorporated into the catalyst by impregnation of the washed nickel-aluminium containing precipitate from a solution of a alkali metal or alkaline earth metal compound.

5. A process as claimed in claim 11 wherein said ruthenium and alkali metal or alkaline earth metal components are incorporated into said catalyst by impregnation of the washed nickel-aluminiun containing catalyst with a solution of an alkali metal or alkaline earth metal ruthenate.

6. A process as claimed in claim 1 wherein the nickel content ranges from 40 to 70% by weight.

7. A process as claimed in claim 1 wherein the ruthenium content of the calcined but unreduced catalyst ranges from 0.2 to 0.5% by weight of the total calcined but unreduced catalytic components.

* * * * *